United States Patent [19]

Santilli et al.

[11] Patent Number: 5,837,044

[45] Date of Patent: Nov. 17, 1998

[54] INK JET INKS CONTAINING POLYETHYLENE FATTY ETHER ADDITIVES

[75] Inventors: Domenic Santilli, Webster; Ravi Sharma, Rochester, both of N.Y.

[73] Assignee: Eastman Kodak Company, Rochester, N.Y.

[21] Appl. No.: 689,640

[22] Filed: Aug. 13, 1996

[51] Int. Cl.⁶ ..................................................... C09D 11/02

[52] U.S. Cl. ..................................... 106/31.67; 106/31.86

[58] Field of Search ............................... 106/31.67, 31.86

[56] References Cited

U.S. PATENT DOCUMENTS

| | | | |
|---|---|---|---|
| 4,740,549 | 4/1988 | Okuzono et al. | 106/31.58 |
| 4,822,417 | 4/1989 | Kobayashi et al. | 106/31.67 |
| 5,441,561 | 8/1995 | Chujo et al. | 106/31.43 |
| 5,538,548 | 7/1996 | Yamazaki | 106/31.65 |
| 5,580,372 | 12/1996 | Gino et al. | 106/31.43 |
| 5,643,357 | 7/1997 | Breton et al. | 106/31.25 |
| 5,651,813 | 7/1997 | Santilli et al. | 106/31.67 |

*Primary Examiner*—Helene Klemanski
*Attorney, Agent, or Firm*—John R. Everett

[57] ABSTRACT

A liqiud ink jet ink comprising a carrier, a pigment, a dispersant and a polyoxyethylene fatty ether additive.

6 Claims, No Drawings

INK JET INKS CONTAINING POLYETHYLENE FATTY ETHER ADDITIVES

FIELD OF THE INVENTION

This invention relates to the field of ink jet inks and ink jet printing.

BACKGROUND OF THE INVENTION

Ink jet printing is a non-impact method for producing images by the deposition of ink droplets on a substrate (paper, transparent film, fabric, etc.) in response to digital signals. Ink jet printers have found broad applications across markets ranging from industrial labeling to short run printing to desktop document and pictorial imaging. The inks used in ink jet printers are generally classified as either dye-based or pigment-based.

Pigment based inks have been gaining in popularity as a means of addressing these limitations. In pigment-based inks, the colorant exists as discrete particles. The problem is that these inks interact with specially coated image receiving substrates, such as transparent films used for overhead projection and the glossy papers and opaque white films used for high quality graphics, to produce cracked images. Another defect known as "starvation" relates to some inconsistencies in a stream of ink being ejected by ink jet printe causes changes of image densities and/or loss of information.

SUMMARY OF THE INVENTION

The present invention provides ink jet inks comprising a liquid ink jet ink wherein said ink comprises a carrier, a pigment, a dispersing agent and a polyoxyethylene fatty ether additive having the structure (1):

$$RO(C_2H_4O)_nH;$$

wherein R represents:

(a) lauryl and n is 23;
(b) cetyl and n is 20;
(c) stearyl and n is 20 or 100 and
(d) oleyl and n is 20.

Images printed using these ink jet inks have much improved quality. In many cases cracking and the aforementioned starvation is entirely eliminated.

DETAILED DESCRIPTION OF THE INVENTION

The polyoxyethylene fatty ethers are derived from lauryl, cetyl, stearyl and oleyl alcohols. They are available from ICI Americas under the trade name Brij™. Table 1 present the useful polyoxyethylene fatty ether additives and the related trade name designation.

TABLE 1

| Brij ™ | R | n |
|---|---|---|
| 35 | lauryl | 23 |
| 58 | cetyl | 20 |
| 78 | stearyl | 20 |
| 98 | oleyl | 20 |
| 700 | stearyl | 100 |

The process of preparing inks from pigments commonly involves two steps: (a) a dispersing or milling step to break up the pigment to the primary particle, and (b) dilution step in which the dispersed pigment concentrate is diluted with a carrier and other addenda to a working strength ink. In the milling step, the pigment is usually suspended to a carrier (typically the same carrier as that in the finished ink) along with rigid, inert milling media. Optionally, the polyoxyethylene fatty ether defined for this invention may be added to the mill grind. Mechanical energy is supplied to this pigment dispersion, and the collisions between the milling media and the pigment cause the pigment to break up into smaller particles. A dispersant or stabilizer, or both, is commonly added to the pigment dispersion to facilitate the deaggregation of the raw pigment, to maintain colloidal particle stability, and to retard particle reagglomeration and settling.

There are many different types of materials which may be used as milling media, such as glasses, ceramics, metals, and plastics. In a preferred embodiment, the grinding media can comprise particles, preferably substantially spherical in shape, e.g., beads, consisting essentially of a polymeric resin.

In general, polymeric resins suitable for use as milling media are chemically and physically inert, substantially free of metals, solvent and monomers, and of sufficient hardness to enable them to avoid being chipped or crushed during milling. Suitable polymeric resins include crosslinked polystyrenes, such as polystyrene crosslinked with divinylbenzene, styrene copolymers, polyacrylates such as poly(methyl methylacrylate), polycarbonates, polyacetals, such as Derlin™, vinyl chloride polymers and copolymers, polyurethanes, polyamides, poly(tetra-fluoroethylenes), e.g., Teflon™, and other fluoropolymers, high density polyethylenes, polypropylenes, cellulose ethers and esters such as cellulose acetate, poly(hydroxyethylmethacrylate), poly(hydroxyethyl acrylate), silicone containing polymers such as polysiloxanes and the like. The polymer can be biodegradable. Exemplary biodegradable polymers include poly(lactides), poly(glycolids) copolymers of lactides and glycolide, polyanhydrides, poly(imino carbonates), poly(N-acylhydroxyproline) esters, poly(N-palmitoyl hydroxyprolino) esters, ethylene-vinyl acetate copolymers, poly(orthoesters), poly(caprolactones), and poly (phosphazenes). The polymeric resin can have a density from 0.9 to 3.0 g/cm³. Higher density resins are preferred inasmuch as it is believed that these provide more efficient particle size reduction. Most preferred are crosslinked or uncrosslinked polymeric media based on styrene.

Milling can take place in any suitable grinding mill. Suitable mills include an airjet mill, a roller mill, a ball mill, an attritor mill and a bead mill. A high speed mill is preferred.

By high speed mill we mean milling devices capable of accelerating milling media to velocities greater than about 5 meters per second. The mill can contain a rotating shaft with one or more impellers. In such a mill the velocity imparted to the media is approximately equal to the peripheral velocity of the impeller, which is the product of the impeller revolutions per minute,π, and the impeller diameter. Sufficient milling media velocity is achieved, for example, in Cowles-type saw tooth impeller having a diameter of 40 mm when operated at 9,000 rpm. The preferred proportions of the milling media, the pigment, the liquid dispersion medium, and dispersant can vary within wide limits and depends, for example, upon the particular material selected and the size and density of the milling media etc. The process can be carried out in a continuous or batch mode.

Batch Milling

A slurry of milling media having a diameter of less than 100 μm, carrier liquid, pigment and dispersant is prepared using simple mixing. This slurry may be milled in conventional high energy batch milling processes such as high speed attritor mills, vibratory mills, ball mills, etc. This slurry is milled for a predetermined length of time to allow comminution of the active material to a minimum particle size. After milling is complete, the dispersion of active material is separated from the grinding media by a simple sieving, centrifugation or filtration.

Continuous Media Recirculation Milling

A slurry of milling media having a diameter of less than 100 μm, carrier liquid, pigment and dispersant may be continuously recirculated from a holding vessel through a conventional media mill which has a media separator screen adjusted to >100 μm to allow free passage of the media throughout the circuit. After milling is complete, the dispersion of active material is separated from the grinding media by simple sieving, centrifugation or filtration.

With either of the above modes the preferred amounts and ratios of the ingredients of the mill grind will vary widely depending upon the specific materials and the intended applications. The contents of the milling mixture comprise the mill grind and the milling media. The mill grind comprises pigment, dispersant and a liquid carrier such as water. For aqueous ink jet inks, the pigment is usually present in the mill grind at 1 to 50 weight %, excluding the milling media. The weight ratio of pigment to dispersant is 20:1 to 1:2. The high speed mill is a high agitation device, such as those manufactured by Morehouse-Cowles, Hockmeyer et al.

The dispersant is another important ingredient in the mill grind. Preferred dispersants for aqueous ink jet inks include sodium dodecyl sulfate, acrylic and styrene-acrylic copolymers, such as those disclosed in U.S. Pat. Nos. 5,085,698 and 5,172,133, and sulfonated polyesters and styrenics, such as those disclosed in U.S. Pat. No. 4,597,794. Other patents referred to above in connection with pigment availability also disclose a wide variety of dispersant to select from. The dispersant used in the examples is sodium N-methyl-N-oleoyl taurate (OMT).

The milling time can vary widely and depends upon the pigment, mechanical means and residence conditions selected, the initial and desired final particle size, etc. For aqueous mill grinds using the preferred pigments, dispersants, and milling media described above, milling times will typically range from 1 to 100 hours. The milled pigment concentrate is preferably separated from the milling media by filtration.

In the present invention, any of the known pigments can be used. Pigments can be selected from those disclosed, for example, in U.S. Pat. Nos. 5,026,427; 5,085,698; 5,141,556; 5,160,370 and 5,169,436. The exact choice of pigment will depend upon the specific color reproduction and image stability requirements of the printer and application. For four-color printers combination of cyan, magenta, yellow, and black (CMYK) pigments should be used. An exemplary four color set may be copper phthalocyanine (pigment blue 15), quinacridone magenta (pigment red 122), pigment yellow 74 and carbon black (pigment black 7).

The aqueous carrier medium is water or a mixture of water and at least one water miscible co-solvent. Selection of a suitable mixture depends on requirements of the specific application, such as desired surface tension and viscosity, the selected pigment, drying time of the pigmented ink jet ink, and the type of paper onto which the ink will be printed. Representative examples of water-soluble co-solvents that may be selected include (1) alcohols, such as methyl alcohol, ethyl alcohol, n-propy alcohol, isopropyl alcohol, n-butyl alcohol, sec-butyl alcohol, t-butyl alcohol, iso-butyl alcohol, furfuryl alcohol, tetrahydrofurfuryl alcohol; (2) ketones or ketoalcohols such as acetone, methyl ethyl ketone and diacetone alcohol; (3) ethers, such as tetrahydrofuran and dioxane; (4) esters, such as ethyl acetate, ethyl lactate, ethylene carbonate and propylene carbonate; (5) polyhydric alcohols, such as ethylene glycol, diethylene glycol, triethylene glycol, propylene glycol, tetraethylene glycol, polyethylene glycol, glycerol, 2-methyl-2,4-pentanediol 1,2,6-hexanetriol and thioglycol; (6) lower alkyl mono- or di-ethers derived from alkylene glycols, such as ethylene glycol mono-methyl (or -ethyl) ether, diethylene glycol mono-methyl (or -ethyl) ether, propylene glycol mono-methyl (or -ethyl) ether, triethylene glycol mono-methyl (or -ethyl) ether and diethylene glycol di-methyl (or -ethyl) ether; (7) nitrogen containing cyclic compounds, such as pyrrolidone, N-methyl-2-pyrrolidone, and 1,3-dimethyl-2-imidazolidinone; and (8) sulfur-containing compounds such as dimethyl sulfoxide and tetramethylene sulfone.

Ink Preparation

In general it is desirable to make the pigmented ink jet ink in the form of a concentrated mill grind, which is subsequently diluted to the appropriate concentration for use in the ink jet printing system. This technique permits preparation of a greater quantity of pigmented ink from the equipment. If the mill grind was made in a solvent, it is diluted with water and optionally other solvents to the appropriate concentration. If it was made in water, it is diluted with either additional water or water miscible solvents to make a mill grind of the desired concentration. By dilution, the ink is adjusted to the desired viscosity, color, hue, saturation density, and print area coverage for the particular application.

In the case of organic pigments, the ink may contain up to approximately 30% pigment by weight, but will generally be in the range of approximately 0.5 to 10%, preferably approximately 0.1 to 5%, by weight of the total ink composition for most thermal ink jet printing applications. If an inorganic pigment is selected, the ink will tend to contain higher weight percentages of pigment than with comparable inks employing organic pigments, and may be as high as approximately 75% in come cases, since inorganic pigments generally have higher specific gravities than organic pigments.

The amount of aqueous carrier medium is in the range of approximately 70 to 98 weight %, preferably approximately 90 to 98 weight %, based on the total weight of the ink. A mixture of water and a polyhydric alcohol, such as diethylene glycol, is preferred as the aqueous carrier medium. In the case of a mixture of water and diethylene glycol, the aqueous carrier medium usually contains from about 30% water/70% diethylene glycol to about 95% water/5% diethylene glycol. The preferred ratios are approximately 60% water/40% diethylene glycol to about 95% water/5% diethylene glycol. Percentages are based on the total weight of the aqueous carrier medium.

Polyoxyethylene fatty ethers defined for this invention are added in a concentration of 0.2 to 5 weight percent as previously stated if not already included in the mill grind.

Jet velocity, separation length of the droplets, drop size and stream stability are greatly affected by the surface tension and the viscosity of the ink. Pigmented ink jet inks suitable for use with ink jet printing systems should have a surface tension in the range of about 20 dynes/cm to about 60 dynes/cm and, more preferably, in the range 30 dynes/cm to about 50 dynes/cm. Control of surface tensions in aqueous inks is accomplished by additions of small amounts of surfactants. The level of surfactants to be used can be determined through simple trial and error experiments. Anionic and cationic surfactants may be selected from those disclosed in U.S. Pat. Nos. 5,324,349; 4,156,616 and 5,279,654 as well as many other surfactants known in the ink jet ink art. Commercial surfactants include the Surfynols® from Air Products; the Zonyls® from DuPont and the Fluorads® from 3M.

Acceptable viscosities are no greater than 20 centipoise, and preferably in the range of about 1.0 to about 10.0, preferably 1.0 to 5.0 centipoise at room temperature.

The ink has physical properties compatible with a wide range of ejecting conditions, i.e., driving voltages and pulse widths for thermal ink jet printing devices, driving frequencies of the piezo element for either a drop-on-demand device or a continuous device, and the shape and size of Other ingredients are also commonly added to ink jet inks. A humectant, or co-solvent, is commonly added to help prevent the ink from drying out or crusting in the orifices of he printhead. A penetrant may also be optionally added to help the ink penetrate the receiving substrate, especially when the substrate is a highly sized paper. A biocide, such as Proxel® GXL from Zeneca Colours may be added at a concentration of 0.05–0.5 weight percent to prevent unwanted microbial growth which may occur in the ink over time. Additional additives which may optionally be present in ink jet inks include thickeners, conductivity enhancing agents, anti-kogation agents, drying agents, and defoamers.

The ink jet inks provided by this invention are employed in ink jet printing wherein liquid ink drops are applied in a controlled fashion to an ink receptive layer substrate, by ejecting ink droplets from the plurality of nozzles, or orifices, in a print head of ink jet printers.

Commercially available ink jet printers use several different schemes to control the deposition of the ink droplets. Such schemes are generally of two types: continues stream and drop-on-demand.

In drop-on-demand systems, a droplet of ink is ejected from an orifice directly to a position on the ink receptive layer by pressure created by, for example, a piezoelectric device, an acoustic device, or a thermal process controlled in accordance digital data signals. An ink droplet is not generated and ejected through the orifices of the print head unless it is needed. Ink jet printing methods, and related printers, are commercially available and need not be described in detail.

The following examples further clarify the invention.

EXAMPLES 1–10

Ink jet inks, containing different polyoxyethylene fatty ether additives were prepared and then evaluated for image quality. First a millgrind was prepared and then diluted to form the ink.

A typical ink jet ink composition was prepared. First an ink concentrate dispersion was prepared with the following ingredients.

Comparative Example 1.

| Mill Grind | |
|---|---|
| Black Pearl 880 (Pigment Black 7, Cabot Corp.) | 200 g |
| Oleoyl methyl taurine (OMT) | 40.0 g |
| Deionized water | 950 g |
| Proxel GLX (biocide from Zeneca) | 1.0 g |

The above components were sandmilled using a Premiere/Sussmeyer HML 1.5 Super mill. The mill was run for 4 hours at room temperature. An aliquot of the above dispersion to yield 4.0 g pigment was mixed with 5.0 g diethylene glycol, 5.0 g glycerol, and additional deionized water for a total of 100.0 g. This ink was filtered through 3-$\mu$m filter and introduced into an empty Hewlett-Packard 51626A print cartridge. Images were mad DeskJet™ 540 printer on medium weight Kodak Photographic Quality InkJet paper (Cat.# 885–9480). Image cracking was very noticeable.

EXAMPLE 2

An ink was prepared in the same manner as that described in Example 1, except 5.0 g of 10 weight percent solution of Brij™ 78 obtained from ICI America was added to the mixture to obtain a final Brij™ 78 concentration of 0.5 weight percent. Images from this ink were very smooth without any signs of image cracking.

EXAMPLES 3–6

Inks were prepared in the same manner as that described in Example 2, except that Brij™ 78 was replaced with Brij™ 98, 35, 58, 700. Images from these inks were very smooth without any signs of image cracking or starvation lines.

EXAMPLES 7–10

Inks were prepared in the same manner as that described in Example 2, except that Brij™ 78 was added at 0.15, 0.30, 0.50, and 1.0 weight percent. Images from these inks exhibit no cracking at all concentrations except 0.15 weight percent.

Examples 1–10 are summarized in the following table.

TABLE 2

| Example | Brij ™ | Concentration | Crack Rating* |
|---|---|---|---|
| comparative example 1 | None | 0 wt% | 3 |
| 2 | 78 | 0.5 wt% | 0 |
| 3 | 98 | 0.5 wt% | 0 |
| 4 | 35 | 0.5 wt% | 0 |
| 5 | 58 | 0.5 wt% | 0 |
| 6 | 700 | 0.5 wt% | 0 |
| 7 | 78 | 0.15 wt% | 1.5 |
| 8 | 78 | 0.30 wt% | 0 |
| 9 | 78 | 0.50 wt% | 0 |
| 10 | 78 | 1.0 wt% | 0 |

*Crack Rating:
0 = no cracking
1 = small cracks visible at 1OX magnification
2 = small cracks visible with naked eye
3 = large cracks visible with naked eye

EXAMPLES 11–13

Inks were prepared in the same manner as that described in Example 2, except that the carbon black was replaced with Sunfast Quinacridone from Sun Chem. Co., Hansa Yellow, pigment yellow. 74 from Hoechst Chem Co., and a proprietary cyan pigment from Eastman Kodak Co. Images made with these inks exhibited excellent quality without any signs of cracking.

The invention has been described in detail with particular reference to preferred embodiments thereof, but it will be understood that variations and modifications be effected within the spirit and scope of the invention.

We claim:

1. A liquid ink jet ink wherein said ink comprises a carrier, a pigment, a dispersing agent and a polyoxyethylene fatty ether additive having the structure (1):

$RO(C_2H_4O)_nH;$ wherein R represents:
  (a) lauryl and n is 23;
  (b) cetyl and n is 20;
  (c) stearyl and n is 20 or 100 and
  (d) oleyl and n is 20.

2. A liquid ink jet ink according to claim 1 wherein the fatty ether additive is a polyoxyethylene lauryl ether, polyoxyethylene stearyl ether or a polyoxyethylene oleyl ether.

3. The ink of claim 1 or 2 comprising from 0.5 to 10.0 weight percent of pigment, and from 0.3 to 1.0 weight percent of the polyoxyethylene fatty ether.

4. The ink of any one of the preceeding claims wherein the dispersing agent is sodium N-methyl-N-oleoyl taurate (OMT).

5. The ink of claim 4 wherein the pigment is selected from the group consisting of cyan, magenta, yellow, black and mixtures thereof.

6. An inkjet printing method, comprising the steps of:

providing an ink jet printer that is responsive to digital data signals;

loading the printer with ink receptive substrates;

loading the printer with an ink jet ink comprising: a carrier, a pigment and an ink jet ink according to claim 1; and printing on the ink receptive substrates in response to the digital data signals.

* * * * *